United States Patent [19]

Baron

[11] 4,236,863
[45] Dec. 2, 1980

[54] CENTER PIN ASSEMBLY FOR POWER SHOVELS

[75] Inventor: George B. Baron, Marion, Ohio

[73] Assignee: Dresser Industries, Inc., Dallas, Tex.

[21] Appl. No.: 973,397

[22] Filed: Dec. 22, 1978

[51] Int. Cl.$^3$ .............................................. E02F 3/00
[52] U.S. Cl. .................................. 414/687; 308/220; 308/136; 414/690
[58] Field of Search .............................. 308/220–227, 308/136, 175, 176, 78; 180/658, 659; 105/275, 455, 189; 212/70; 414/686, 687, 690–695

[56] References Cited

U.S. PATENT DOCUMENTS

| | | | |
|---|---|---|---|
| 749,172 | 1/1904 | Cutting | 105/455 X |
| 922,124 | 5/1909 | Freeburg | 308/223 |
| 1,473,935 | 11/1923 | Horton | 212/70 |
| 2,380,626 | 7/1945 | Zeilman et al. | 414/690 X |

Primary Examiner—Stephen G. Kunin
Assistant Examiner—Terrance L. Siemens
Attorney, Agent, or Firm—Ward, Lalos, Leeds, Keegan & Lett

[57] ABSTRACT

In a power shovel having a lower frame and an upper frame rotatably supported on the lower frame, a center pin assembly for carrying radial and axial loads imposed on the upper frame comprising a downwardly opening socket mounted on the lower frame, a pin disposed on the axis of rotation of the upper frame, the pin having a center section and an annular section, the center pin section having an upper end rigidly secured to the upper frame and a lower portion extending downwardly into the socket, the annular pin section being interposed between the socket and the lower end of the center pin section, the annular pin section and the socket having bearing contact surfaces, axially spaced, annular sealing rings disposed between the lower portion of the center pin section and the annular pin section providing an annular variable volume chamber therebetween and means for supplying a measured volume of fluid to the variable volume chamber to effect a predetermined displacement between the center pin section and the annular pin section and correspondingly a predetermined clearance between the bearing contact surfaces of the annular pin section and the socket.

37 Claims, 6 Drawing Figures

CENTER PIN ASSEMBLY FOR POWER SHOVELS

This invention relates to power shovels and more particularly to a novel center pin assembly for a power shovel.

The lower works of a power shovel of the type with which the present invention is concerned generally consists of a propelling unit, a lower frame mounted on the propelling unit, a roller circle mounted on the lower frame, a rotatable upper frame supported on the roller circle and a center pin disposed on the axis of rotation of the upper frame, having the lower end thereof rigidly secured to the lower frame and the upper end journaled in the upper frame. In prior art constructions, the center pin normally has been journaled in a bushing provided in the upper frame and has been provided with a large adjustable nut threaded on the upper end of the pin, bearing on a thrust washer.

The principal functions of a center pin in a power shovel are to take radial loads imposed on the upper frame during the operation of the machine, thus maintaining the upper frame centered on the lower frame, and to withstand vertical forces causing the upper frame to tilt. To effectively perform such functions, it is important to maintain certain minimal radial and axial clearances between the upper end of the center pin and the upper frame in which the pin is journaled.

In prior art center pin constructions of the type described, normal wear of bearing contact surfaces results in excessive radial and axial clearances between the center pin and the upper frame. Excessive radial clearance is detrimental in that it allows the upper frame to shift on the roller circle, causing the rollers to slide axially with the result that the rollers tend to cock and develop badly distributed loads along their contact areas. Excessive axial clearance is detrimental in that it allows the upper frame to tilt and apply the full load of the upper frame on a fewer number of rollers. In either circumstance, the effect on the rollers can be destructive.

It has been sought to prevent excessive radial and axial clearances in such center pin assemblies by replacing excessively worn bushings in the upper frame and also by tightening the large adjustable nut threaded on the upper end of the center pin. Such operations, however, require a certain amount of down time of the machine in replacing a worn bushing or the use of special tools to take up the large adjustment nut. Since special effort is required in either instance, such routine preventive maintenance functions are often ignored or neglected. The result of such omission, however, is progressive wear of bushings and other components which correspondingly increases clearances beyond allowable limits, thus compounding the detrimental affects of such conditions. It thus has been found to be highly desirable to provide a center pin assembly for a power shovel in which radial and axial clearances between bearing contact surfaces of the center pin of the machine and a frame in which the pin is journaled will be maintained within desired minimum limits.

Accordingly, it is the principal object of the present invention to provide a novel construction for a power shovel having a lower frame and an upper frame rotatably supported on the lower frame in which radial and axial loads applied on the upper frame will be transmitted effectively and efficiently to the lower frame.

Another object of the present invention is to provide a novel construction for a power shovel having a lower frame and an upper frame rotatably supported on the lower frame in which the upper frame is prevented from excessively shifting or tilting relative to the lower frame.

A further object of the present invention is to provide a novel construction for a power shovel having a lower frame, a roller circle mounted on the lower frame and an upper frame rotatably supported on the roller circle, providing a maximum uniform distribution of loads on the roller circle.

A still further object of the present invention is to provide a novel construction for a power shovel having a lower frame, a roller circle mounted on the lower frame and an upper frame rotatably supported on the roller circle wherein radial and axial loads applied to the upper frame will be transmitted to the lower frame without unduly stressing the rollers of the roller circle.

Another object of the present invention is to provide a novel construction for a power shovel having a lower frame, a live roller circle mounted on the lower frame and an upper frame rotatably supported on the live roller circle in which the upper frame is prevented from shifting relative to the lower frame thus causing the rollers of the roller circle to slide axially with the result that the rollers will cock and develop badly distributed loads along their contact areas, and the upper frame is prevented from tilting excessively causing it to concentrate loads on a fewer number of rollers of the roller circle.

A further object of the present invention is to provide a novel center pin assembly for a power shovel.

A still further object of the present invention is to provide a novel center pin assembly for a power shovel having a lower frame, a roller circle mounted on the lower frame and an upper frame rotatably supported on the roller circle.

Another object of the present invention is to provide a novel center pin assembly for a power shovel having a lower frame and an upper frame rotatably supported on the lower frame, which is effective in preventing the upper frame from shifting or tilting excessively relative to the lower frame.

A further object of the present invention is to provide a novel center pin assembly for a power shovel having a lower frame and an upper frame rotatably supported on the lower frame, which is effective in efficiently transmitting radial and axial loads applied to said upper frame to said lower frame.

Another object of the present invention is to provide a novel center pin assembly for a power shovel having a lower frame and an upper frame rotatably supported on the lower frame, in which excessive wear of bushings and other components is avoided.

A further object of the present invention is to provide a novel center pin assembly for a power shovel having a lower frame and an upper frame rotatably supported on the lower frame, provided with a component journaled in one of the frames in which the clearance between the bearing contact surfaces of such component and the frame in which it is journaled is maintained at a minimum.

A further object of the present invention is to provide a novel center pin assembly for a power shovel having a lower frame and an upper frame rotatably supported on the lower frame, including novel means for locking a component thereof to one of such frames.

A still further object of the present invention is to provide a novel center pin assembly for a power shovel which is comparatively simple in design, effective in operation and readily adaptable to maintenance and servicing.

Other objects and advantages of the present invention will become more apparent to those persons having ordinary skill in the art to which the present invention pertains from the following description taken in conjunction with the accompanying drawings wherein:

FIG. 2a is a fragmentary view of a modification of the structure shown in FIG. 2;

Figure 1:
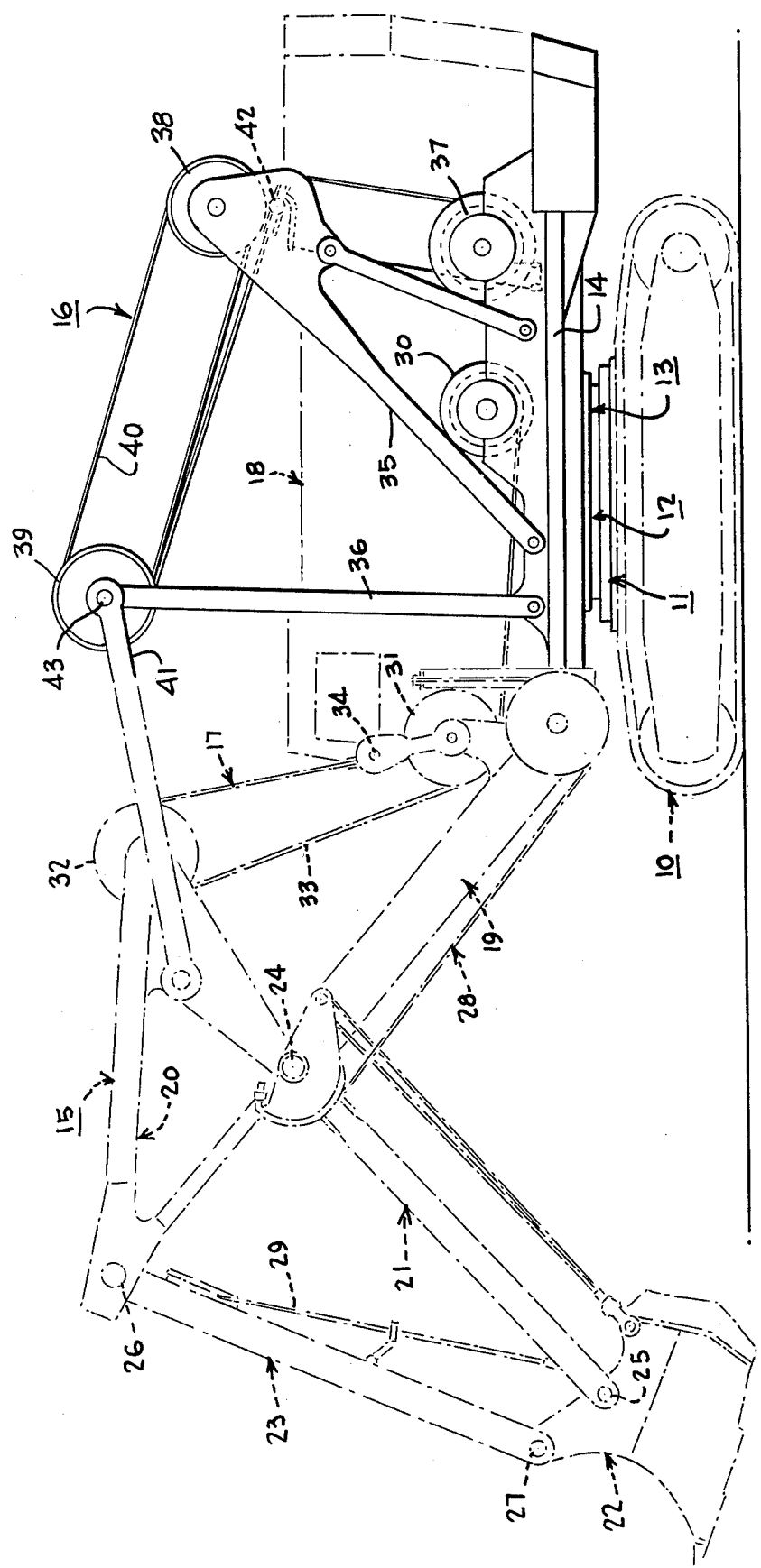
FIG. 1 is a side elevational view of a power shovel incorporating the present invention.

Referring to FIG. 1 of the drawings, there is illustrated a power shovel utilizing an embodiment of the present invention which generally includes a pair of crawler units 10, a lower frame 11 mounted on the crawler units, a live roller circle 12 mounted on the lower frame, an upper frame 13 rotatably supported on the roller circle, a main deck 14 mounted on the upper frame, a front end assembly 15 mounted on the front end of the upper frame, a crowd system 16 mounted on the main deck and operatively connected to the front end assembly, a hoist system 17 mounted on the front end assembly, and appropriate machinery and controls mounted on the main deck for operating the crowd and hoist systems. A housing 18 also is mounted on the main deck which encloses certain structural components, the swing and propulsion machinery of the shovel and other auxiliary systems and equipment.

Front end assembly 15 generally includes a stiffleg 19, a hoist frame 20, a dipper handle 21, a dipper 22 and a hoist link 23. Sitffleg 19 consists of a structural member pivotally connected at its lower end to the front end of upper frame 13 and is provided at its upper end with a head shaft 24. Hoist frame 20 is pivotally mounted on head shaft 24. Dipper handle 21 consists of a suitable structural member and is provided with upper and lower bifurcated ends. The upper bifurcated end is connected to the hoist frame by means of a pair of connecting pins. The lower bifurcated end of the dipper handle is pivotally connected to the upper rear end of dipper 22 by means of a pair of axially aligned pins 25. The forwardly disposed head section of the hoist frame and the upper front end of the dipper are connected by hoist link 23. The upper end of the hoist link is connected to a bifurcated portion of the head section of the hoist frame by means of a connecting pin 26. The lower bifurcated end of the hoist link is connected to the dipper by means of a pair of axially aligned pins 27. It thus will be seen that hoist frame 20, dipper handle 21, dipper 22 and hoist link 23 are pivotally connected together to provide a four-bar linkage with the link comprising the hoist frame being pivotally connected to the upper end of the stiffleg by means of head shaft 24.

To provide a substantially flat pass of the dipper when it is crowded into a bank of material being excavated or loaded, there is provided on the front end assembly a pitch control system 28, the construction and operation of which is fully described in U.S. Pat. Nos. 3,501,034 and 3,648,863. In addition, the front end assembly is provided with a pitch stop assembly 29, the construction and operation of which is fully described in U.S. Pat. No. 4,085,854.

Hoist system 17 generally includes a hoist drum 30, sheaves 31 and 32 and a hoist line 33. Hoist drum 30 is mounted on main deck 14 of the machine and is driven by an electric motor through a gear train also mounted on the main deck. Sheave 31 is mounted on the lower end of stiffleg 19 in longitudinal alignment with hoist drum 30. Sheave 32 is mounted on an upper, rearward end of hoist frame 20. As illustrated in FIG. 1, hoist line 33 is wound on hoist drum 30, extends forwardly and around sheave 31, extends upwardly and around sheave 32 and extends downwardly and is connected to a bail 34 mounted on the mounting shaft of sheave 31. It further will be seen that by operating hoist drum 30 to pay out and take in hoist line 33, hoist frame 20, dipper handle 21 and hoist link 23 will be caused to pivot about head shaft 24 to correspondingly hoist and lower the dipper.

Crowd system 16 consists of a gantry 35, a mast 36, a drum 37, sheaves 38 and 39 and a crowd rope 40. Gantry 35 is mounted on the main deck along the longitudinal center line of the machine. Mast 36 consists of a structural member pivotally connected at its lower end to brackets secured to the main deck, forwardly of the vertical center line of roller circle 12. Crowd drum 37 is mounted on a frame secured to the main deck, rearwardly of hoist drum 30. Similarly to hoist drum 30, crowd drum 37 is driven by an electric motor mounted on the main deck, through a gear train also mounted on the main deck. Sheave 38 is mounted on the upper end of the gantry, substantially above crowd drum 37. Sheave 39 is mounted on the upper end of mast 36 substantially in longitudinal alignment with sheave 38. Crowd rope 30 is wound on crowd drum 37, extends upwardly and is reeved about sheaves 38 and 39 and is connected at the opposite end thereof to a bail 42 mounted on the upper end of the gantry adjacent sheave 38. Crowd link 41 is pivotally connected at the ends thereof to hoist frame 20 and a shaft 43 mounted on the upper end of the mast so that pivotal motion of the mast in a vertical plane will be transmitted by crowd link 41 to the front end assembly of the machine. It will be appreciated that by paying out and taking in crowd rope 40 mast 36 will be caused to pivot in a vertical plane and that such motion will be transmitted to the front end assembly through crowd link 41 to raise and lower the front end assembly.

Figure 2:
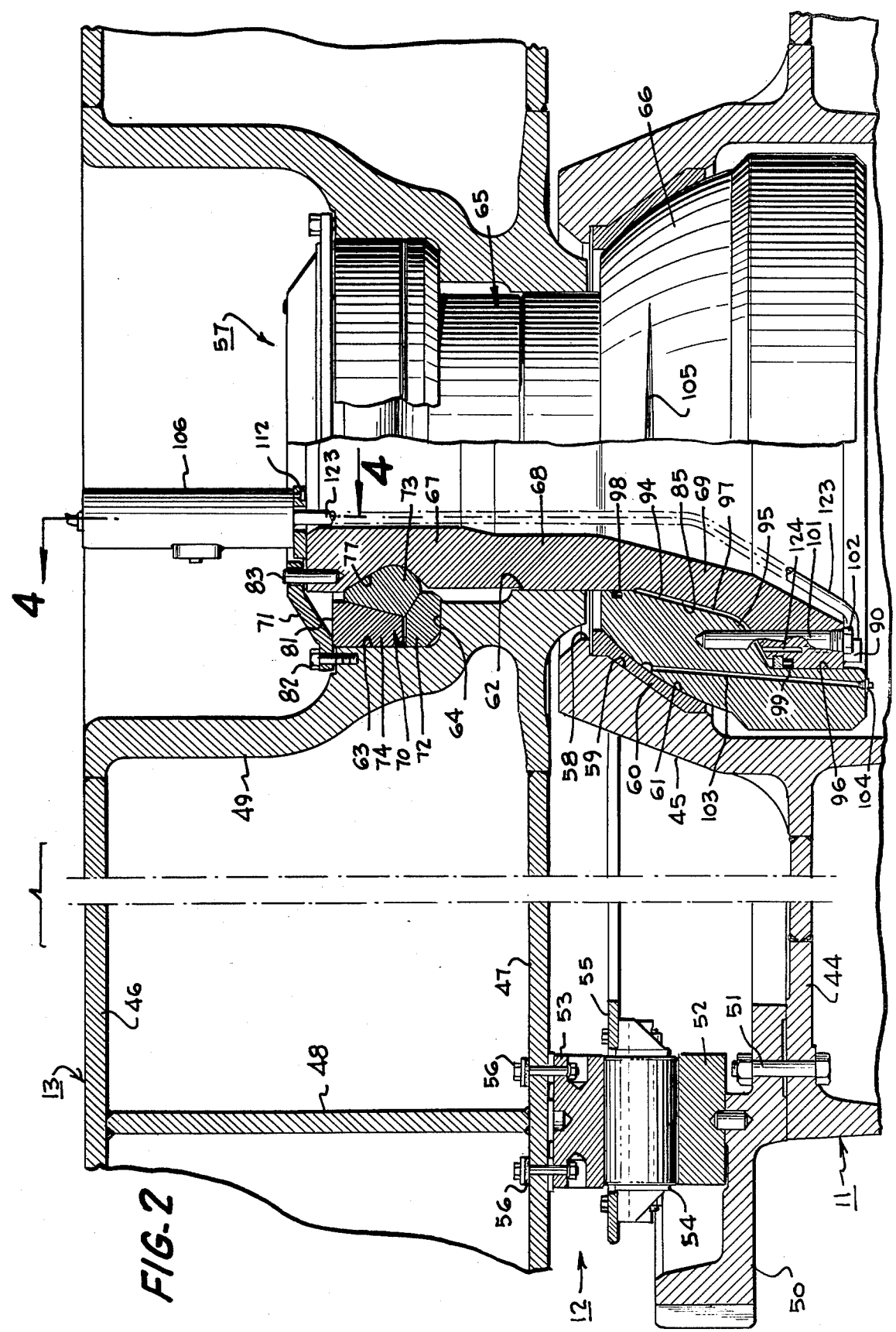
FIG. 2 is an enlarged cross-sectional view taken along line 2—2 of FIG. 1, having portions thereof broken away, illustrating a center pin assembly embodying the present invention.

As best illustrated in FIG. 2, lower frame 11 includes an upper plate 44, a lower plate (not shown), a plurality of interconnecting vertical ribs and an annular housing 45 disposed concentrically with roller circle 12. Upper frame 13 includes an upper plate 46, a lower plate 47, a plurality of interconnecting vertical ribs 48 and an annular housing 49 disposed coaxially with annular housing 45 of the lower frame. A ring gear 50 consisting of a plurality of arcuate segments is mounted about the periphery of the lower frame by means of a plurality of bolts 51. The ring gear is engaged by the pinions of a set of swing drive units mounted on the upper frame which are operated to rotate the upper frame relative to the lower frame about the vertical axis of the roller circle.

Roller circle 12 consists of a lower rail 52, an upper rail 53 a plurality of rollers 54 and a cage structure 55. Lower rail 52 consists of a plurality of arcuate rail segments seated on ring gear 50. Rollers 54 are supported on lower rail 52 and are rotatably mounted on cage structure 55. Upper rail 53 is supported on rollers 54 and consists of a plurality of arcuate rail segments rigidly secured to lower plate 47 of the upper frame by means of bolts 56. It will be appreciated that upon operation of the swing drive units of the machine, upper frame 13 will rotate or swing relative to lower frame 11 as rollers 54 ride on lower rail 52 and upper rail 53 rides on the rollers.

Upper frame 13 is prevented from shifting or tilting relative to lower frame 11 by means of a center pin assembly 57 rigidly secured to upper pin housing 49 and operatively engageable with lower pin housing 45. As best seen in FIG. 2, lower pin housing 45 is provided with an upper axial opening 58 and a downwardly facing conical wall 59 on which there is mounted an annular socket 60. Socket 60 may consist of any bushing material such as bronze or Nylatron. Preferably the socket is press fit into the lower pin housing at the upper and lower ends thereof and is provided with a downwardly facing spherical surface 61. Upper pin housing 49 is provided with a lower circular opening 62 disposed coaxially with upper opening 58 of the lower pin housing, an upper annular wall 63 and an annular shoulder 64 disposed at the lower end of annular wall 63.

Figure 3:
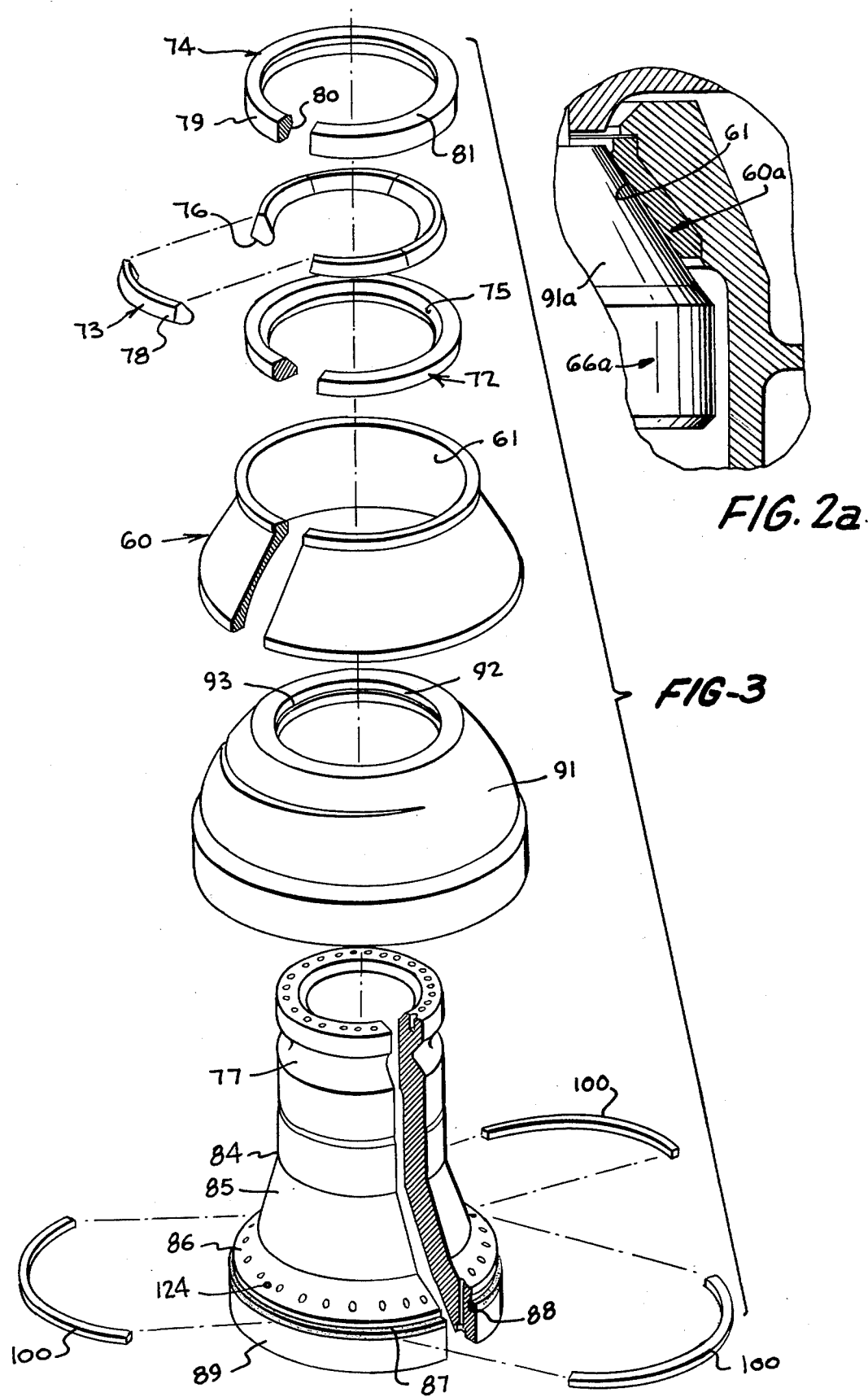
FIG. 3 is an exploded view of the center pin assembly shown in FIG. 2.

Center pin assembly 57 consists of a center pin section 65 and an annular pin section 66. Upper pin section 65 includes an upper, annular portion 67 disposed in upper pin housing 49, an intermediate annular portion 68 downwardly through upper pin housing opening 62 and lower pin housing opening 58, and a lower, annular flaring portion 69 which is received within lower pin housing 45. Center pin section 65 is rigidly secured to upper frame 13 by means of a pin retaining assembly 70 and a cover plate 71. As best illustrated in FIG. 3, pin retaining assembly 70 consists of a seating ring 72, a plurality of arcuate locking segments 73 and a retainer ring 74. Seating ring 72 is supported on annular shoulder 64 on the upper pin housing and engages the lower end of annular wall 63. It further is provided with an inner, conical surface 75 for seating arcuate locking segments 63. Seating surface 75 is disposed at substantially a 30° angle relative to the horizontal. Each of locking segments 73 is provided with a lower conical surface 76 seated on surface 75 of the seating ring, an inwardly projecting portion received within an annular groove 77 provided on upper annular portion 67 of center pin section 65, and an outer surface 78 disposed in opposed relation to housing wall 63 when the segment is supported on the seating ring and received within the annular groove in the center pin section. Preferably, surface 78 is disposed substantially at a 15° angle relative to the vertical and the opposite side thereof within the groove is disposed at a 30° angle to the vertical. Retainer ring 74 is received between housing wall 63 and arcuate locking segments 73 to provide a wedging action and thus maintain the locking segments in annular groove 77 in the center pin section. Retainer ring 74 is provided with an outer annular wall 79 which engages housing wall 63, an inner conical wall 80 which engages conical surfaces 78 of the locking segments and an upper annular surface 81. Retainer ring 74 is urged into wedging relation with the locking pin segments by means of annular cover plate 71. As best illustrated in FIG. 2, cover plate 71 is adapted to engage upper surface 81 and is secured to the upper pin housing by means of a plurality of circumferentially spaced bolts 82. Center pin section 65 is prevented from rotating relative to the upper frame by means of a plurality of pins 83 received within a plurality of circumferentially spaced, aligned pin openings in cover plate 71 and the upper end of the center pin section.

Intermediate portion 68 of the center pin section extends through upper pin housing opening 62 and is disposed in bearing contact therewith so that radial and axial loads applied on the upper frame will be transmitted directly through the upper pin housing or indirectly through the retainer pin assembly to the center pin section to be transmitted to the lower frame. It will be noted that the retainer pin assembly and the close fit of the intermediate portion of the center pin section in upper pin housing opening 62 provide for the upper and intermediate portions of the center pin section to be rigidly secured to the upper frame as though the upper and intermediate portions of the center pin section were formed integrally with the upper frame.

Referring again to FIG. 3, the lower portion of center pin section 65 is provided with an outer, annular surface 84 forming a continuation of the outer, annular surface of intermediate portion 68, an outer, upper conical surface 85, an outer, lower conical surface 86 having a greater slope than conical surface 85, an outer, intermediate annular surface 87, an annular shoulder 88, a lower annular surface 89 and a bottom annular surface 90.

Annular pin section 67 is supported on the lower end of the center pin section and is interposed between the lower end of the center pin section and socket 60. It is provided with an outer, spherical surface 91 which is disposed in bearing contact with spherical surface 61 of the socket member. Contact surfaces 91 of the annular pin section and 61 of socket 60 can be of any configuration sufficient to transmit radial and axial loads applied to the upper frame and transmitted through the center pin assembly to the lower frame, including conical and spherical configurations. In applications where conical configurations are employed, it is preferred that the upper and lower ends of the conical surface of the annular pin section be relieved. Where spherical configurations are employed, it is preferred that the surface of the socket be modified slightly from that of a true sphere to avoid concentrations of loads at the upper and lower ends thereof. On the inner side of annular pin section 65, there is provided an upper annular surface 92 engageable with annular surface 84 of the center pin section, which is provided with an annular groove 93, an upper conical surface 94 disposed in opposed relation to conical surface 85 of the center pin section, a lower conical surface 95 disposed in opposed relation to conical surface 86 of the center pin section and an annular surface 96 disposed in opposed relation to annular surface 87 and engageable with annular surface 89 of the center pin section.

Referring to FIG. 2, it will be noted that annular pin section 66 is displaceable relative to the lower end of the center pin section, providing a variable volume chamber 97 generally defined by the outer conical surfaces of the lower portion of the center pin section and the inner conical surfaces of the annular pin section. As will hereinafter be described in detail, a measured amount of fluid is adapted to be supplied to variable volume chamber 97 to displace annular pin section 66 relative to the lower end of center pin section 65 to correspondingly adjust the clearance between the opposed spherical surfaces of the annular pin section and socket 60. Leakage of fluid from chamber 97 is prevented by an upper sealing ring 98 disposed in annular groove 93, forming a seal between the upper end of the annular pin section and the center pin section, and a sealing ring 99 seated on annular surface 88, forming a seal between the lower end of the annular pin section and the center pin section. A plurality of arcuate retainer segments 100 are provided between surfaces 96 of the annular pin section and surface 87 of the center pin section, above sealing ring 99 to retain sealing ring 99.

Rotation of annular pin section 66 relative to the lower end of center pin section 65 is prevented by a plurality of pins 101 received within vertically aligned openings in the annular and center pin sections and seated on plugs 102 threaded into the lower ends of the pin receiving openings in the center pin section. Lubricating grease is supplied to opposed surfaces 61 of the socket and 91 of the annular pin section by means of a fluid passageway 103 provided in the annular pin section, having a grease fitting 104 at the lower end thereof and communicating with a grease groove 105 formed on spherical surface 91, at the upper end thereof.

In view of the narrow width of the bearing contact surfaces of the socket and the annular pin section in comparison to other dimensions of the machine, it makes little practical difference whether such surfaces are spherical or conical. What is more important than the precise configuration of such surfaces is that the angle of the annular pin section be such that the bearing pressure on the contact surfaces under full radial load is a little less than the bearing pressure resulting from full axial load.

Referring to FIG. 2a, illustrating the modification of the structure shown in FIG. 2, there is provided a socket 60a having a downwardly facing conical surface 61a which is engaged by a conical surface 91a of annular pin section 66a.

At the beginning of each digging cycle of the machine as described, the crowd system is operated to fully retract the front end assembly and the hoist system is operated to lower the dipper so that the dipper is positioned adjacent the lower end of the stiffleg. To commence the operating cycle of the machine, the operator manipulates appropriate controls at the operator's station on the machine to permit the crowd rope to pay out. Under such conditions, the weight of the front end assembly will cause the stiffleg to pivot forwardly, crowding the dipper into the material being excavated or loaded. Simultaneously with the commencement of the crowding action of the dipper, appropriate controls are operated on the machine to effect limited hoisting motion of the dipper. This is accomplished by operating hoist drum 30 to take up hoist line 33. As the dipper is crowded into the bank of material, the combined crowding and hoisting action causes the dipper to make a flat pass. At the same time, pitch control system 28 causes the pitch of the dipper to remain constant relative to the ground. At the end of the crowd phase of the cycle, the pitch control mechanism is released to cause the dipper to pitch upwardly and thus assure a full load of material in the dipper. The upward pitch of the dipper is restricted by pitch stop assembly 29 in the manner as described in the aforementioned patent relating to such system.

After the dipper has been pitched upwardly, controls for the crowd and hoist systems and swing machinery are operated to move the dipper and position it above the dump body of a hauling vehicle or another suitable repository for the material where the door of the dipper is tripped to cause the door to open and the material to be unloaded. The desired retracting motion of the front end assembly is effected by operating the motor for crowd drum 37 to take in crowd rope 40. Under such conditions, mast 36 will be caused to pivot rearwardly and such motion will be transmitted to the front end assembly causing the stiffleg to pivot upwardly.

As soon as the material has been dumped, the swing machinery can be operated to rotate the front end of the machine back to the embankment, the crowd system can be operated to continue to retract the front end assembly and the hoist system can be operated to permit the dipper handle to swing downwardly at a controlled rate until the dipper again is positioned at the lower end of the stiffleg, ready to begin another operating cycle.

When radial and axial loads are applied to the upper frame of the machinery, as when the dipper is being crowded into an embankment or the dipper is being hoisted, such loads are transmitted through the center pin assembly to the lower pin housing of the lower frame. In particular, such radial and axial loads are transmitted from annular pin section 66 to socket 60. If the clearance between spherical surface 91 of the annular pin section and spherical surface 61 of the socket is excessive, such loads will cause the upper frame to shift relative to the lower frame causing rollers 54 of the roller circle to slide axially with the result that such rollers will tend to cock and develop badly distributed loads along their contact areas, and the upper frame will be caused to tilt relative to the lower frame thus concentrating the entire axial load on a few number of rollers disposed along the front of the machine. In order to avoid such undesirable conditions, it is important to maintain a minimum clearance between the engaging surfaces of the annular pin section and the socket.

In the construction as described, minimum clearance between the contact surfaces of the annular pin section and the socket is achieved by periodically supplying a fluid under pressure to variable volume chamber 97, causing the chamber to expand and correspondingly annular pin section 65 to become displaced axially relative to the lower end of center pin section 65 and engage socket 60. After chamber 97 has been fully expanded and the annular pin section has been displaced sufficiently so that spherical surface 91 thereof is in full bearing contact with spherical surface 61 of socket 60, a measured volume of fluid is removed from chamber 97 causing annular pin section 66 to be displaced axially relative to socket 60 to provide a predetermined, minimum clearance therebetween.

Figure 4:
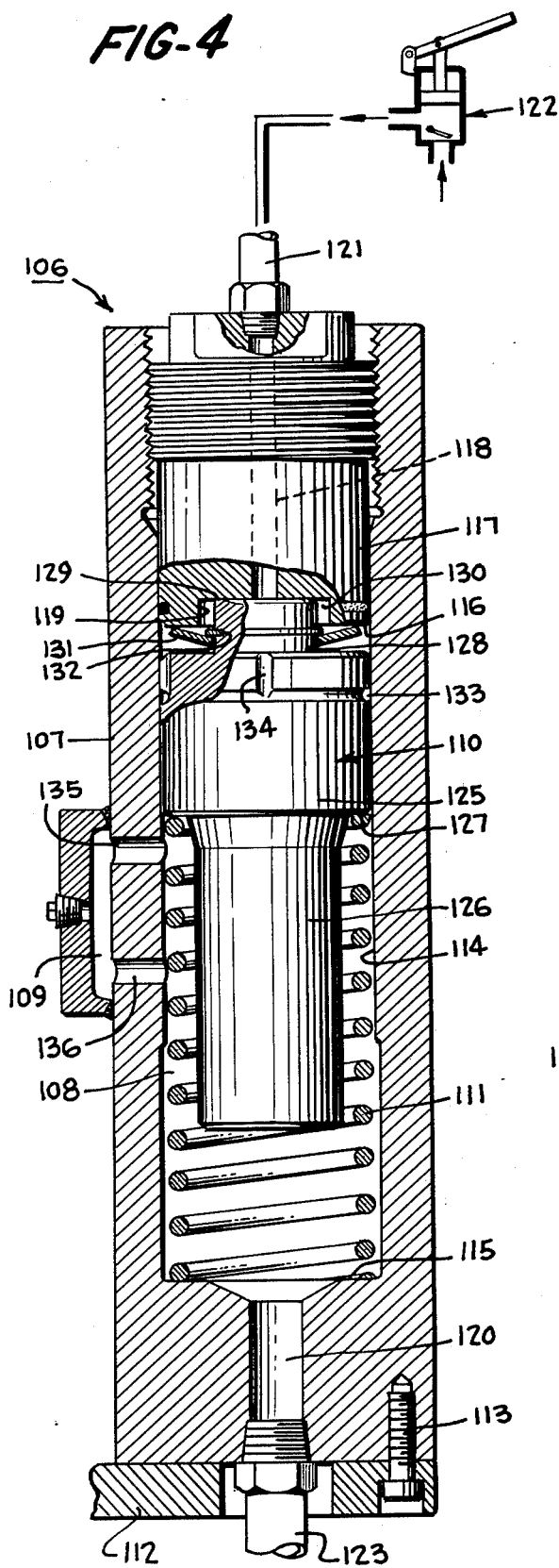
FIG. 4 is an enlarged cross-sectional view taken along line 4—4 in FIG. 2.
Figure 5:
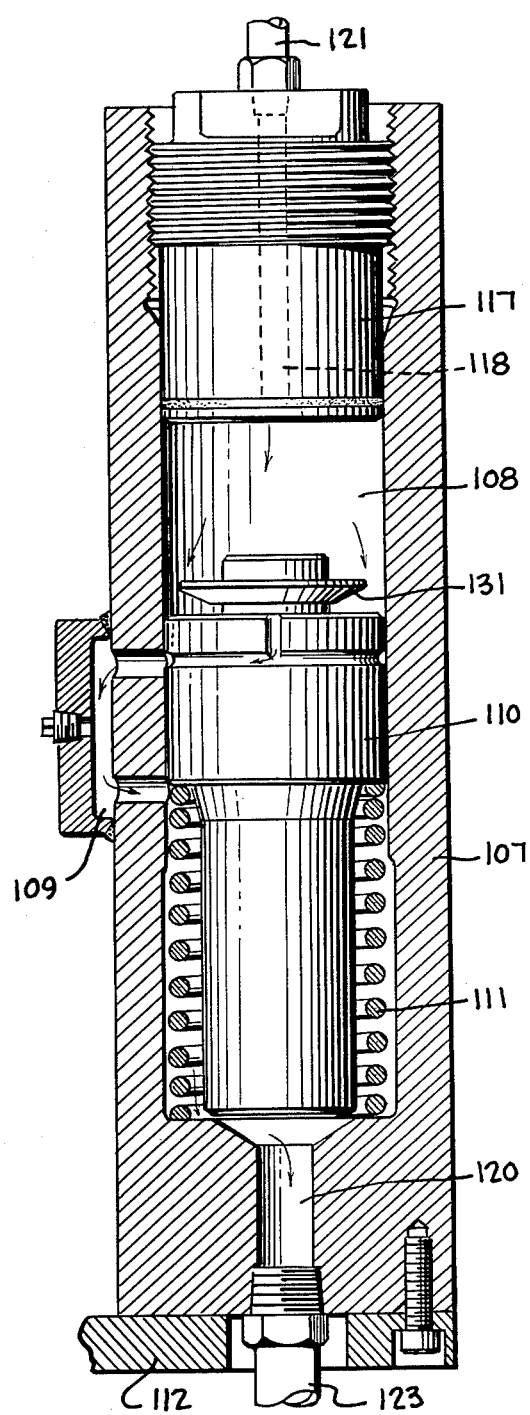
FIG. 5 is a view similar to the view shown in FIG. 4, illustrating certain components thereof in sequential positions.

Any suitable device or method may be employed within the scope of the invention to provide the minimum clearance between the annular pin section and the socket member as described. In the embodiment as described, such function is provided by a fluid measuring device 106 which is best illustrated in FIGS. 4 and 5. Generally, the device consists of a body 107 having a cylindrical chamber 108 and a fluid by-pass 109, a plunger 110 disposed in chamber 108 and a spring 111 mounted at one end of chamber 108 between an end wall of the chamber and the plunger. Body member 107 is seated on a horizontal bracket 112 mounted on the upper end of center pin housing 65 and is secured to the bracket by bolts 113. Chamber 108 is defined by a cylindrical wall 114, a lower end wall 115 and an upper end wall 116 provided at the lower end of a plug 117 threaded into the upper end of body 107. Plug 117 is provided with an axial fluid passageway 118 defining a fluid inlet port which communicates with chamber 108 through an axially disposed recess 119 formed on lower end surfaces 116 of plug 117. The lower end of the body is provided with a fluid passageway 120 defining a fluid outlet port, which is disposed in axial alignment with fluid inlet port 118. Fluid inlet port 118 is connected through a line 121 with a suitable source of fluid under pressure. Either a hand pump 122 or preferably an air operated intensifier can be used to charge the unit. Fluid outlet port 120 is connected to a line 123 which extends downwardly though center pin section 65 and communicates with a passageway 124 in the lower portion of the center pin section which communicates with variable volume chamber 97.

Plunger 110 includes an intermediate head portion 125 which engages cylindrical wall 114 of chamber 108, a lower portion 126 of reduced diameter forming an annular shoulder 127 and an upper portion 128 also of a reduced diameter. Upper portion 128 of the plunger is adapted to be received within recess 119 of plug 117 and is provided with an end surface 129 engageable with the bottom surface 130 of recess 19 to obstruct fluid inlet port 118. End surface 129 of plunger portion 128 is maintained out of engagement with bottom wall 130 under normal operating conditions by means of a disc spring 131 which is secured on plunger portion 128 by a snap ring 132 and which engages end wall 116. Disc spring 131 is urged in contact with end wall 116 by means of spring 111 seated on lower wall 115 and engaging annular surface 127 of the plunger. It will be noted that the force exerted by spring 111 on plunger 110 is insufficient to overcome the biasing action of the disc spring 131 maintaining end surface 129 of plunger portion 128 out of engagement with bottom wall 130 of recess 119.

Head portion 125 of the plunger is provided with an annular groove 133 and a plurality of circumferentially spaced, longitudinally disposed grooves 134 which intercommunicate the upper end of chamber 108 and groove 133. When fluid under pressure is supplied to the upper end of chamber 108, plunger 110 is adapted to be displaced downwardly against the action of spring 111 to register annular groove 133 with an upper port 135 of fluid by-pass 109. As best illustrated in FIG. 5, when annular groove 133 registers with upper by-pass port 135, a lower port 136 of the by-pass will communicate with the lower end of chamber 108, thereby intercommunicating the upper and lower ends of chamber 108 through grooves 134, annular groove 133 and by-pass 109. Furthermore, whenever the supply of fluid under pressure to the upper end of chamber 108 is discontinued, the biasing action of spring 111 will displace the plunger upwardly so that disc spring 131 will engage upper end wall 116 of the chamber, discontinuing the intercommunication between the upper and lower ends of chamber 108.

Whenever it is desired to adjust the clearance between annular pin section 65 and socket member 60 to provide a minimum clearance therebetween, hand pump 122 is operated to supply fluid such as grease under pressure to the upper end of chamber 108 in fluid measuring device 106. Such supply of fluid causes plunger 110 to be displaced downwardly against the action of spring 111 until annular groove 113 in the head section of the plunger registers with upper port 135 of passageway 109. Under such conditions, fluid under pressure flows from the upper end of chamber 108, through passageways 134 and 133, by-pass 109, the lower end of chamber 108, outlet port 120, line 123 and passageway 124 in the lower end of the center pin section to variable volume chamber 97. The supply of fluid under pressure to chamber 97 causes the chamber to expand and, as previously described, annular pin section 66 to be displaced relative to the lower end of the center pin section until it engages and is in full contact with spherical surface 61 of socket member 60. The supply of fluid under pressure to the upper end of chamber 108 is then removed, causing plunger 110 to be displaced upwardly by spring 111. As the plunger moves from the position shown in FIG. 5 to the position shown in FIG. 4, the volume in the system below the chamber expands a predetermined amount causing a measured volume of fluid in variable volume chamber 97 to be removed therefrom. The removal of such measured volume of fluid from chamber 97 causes annular pin section 66 to be displaced relative to the socket member thus providing a predetermined clearance therebetween. By appropriate design of the fluid measuring unit and the components of the center pin assembly, the amount of fluid removed from chamber 97 can be selected to provide the desired minimum clearance between the annular pin section and socket member 60.

The close fit of plunger 110 which has no seal allows a slight leakage of fluid back to the reservoir of the fluid supply source in the order of a few cubic inches per day. Such leakage is desirable for thermal relief but must be prevented when the pressure in the system is high as it would be if the operator of the machine operated the front end assembly so as to apply a high load on the upper frame for a prolonged period of time. Under such conditions, however, the pressure in the system will be applied to the plunger against the action of disc spring 131, causing the plunger to seat against the plug and seal off all linkage.

The controls for applying and removing fluid under pressure from the system preferably are provided at the operator's work station. Adjustment of the bearing clearance is sufficiently easy so that it can be done every day at the beginning of a work shift. The empty dipper should be suspended near its maximum radius during bearing adjustment, to insure that the upper frame deflection does not take up the clearance and cause the bearing to run hot.

The center pin assembly as described provides a number of advantages over comparable center pin constructions in the prior art. The proposed construction establishes and maintains correct axial clearance so as to eliminate operation of the machine with either a loose or tight center pin. Radial clearance is merely a function of axial clearance and is inherently maintained correct along with axial clearance. Bearing wear over a long period of time does not affect radial clearance. There is less abuse of the roller circle and upper and lower frames. Tilting and shifting are restricted and suddenly-applied loads do not cause appreciable impact in the bearing. Load in the bearing itself is always well distributed since clearance is minimized and the proportions of the bearing along with the slight end relief contours of the socket make it insensitive to slight tilting of the pin. There is less tendency for the pin to work loose since radial loads are applied to it primarily in one direction only. Finally, the manufacture and use of extremely large screw threads as required with prior art constructions is avoided.

From the foregoing detailed description, it will be evident that there are a number of changes, adaptations and modifications of the present invention which fall within the province of those persons having ordinary skill in the art to which the present invention pertains. However, it is intended that all such variations not departing from the spirit of the invention be considered as within the scope thereof as limited solely by the appended claims.

I claim:

1. In a power shovel having a lower frame and an upper frame rotatably mounted on said lower frame, a center pin assembly for carrying radial and axial loads imposed on said upper frame comprising a pin disposed on the axis of rotation of said upper frame, rigidly secured to one of said frames and operatively connected to the other of said frames through a ball and socket connection, said ball and socket connection having a socket opening away from the frame to which said pin is secured.

2. In a power shovel having a lower frame and an upper frame rotatably mounted on said lower frame, a center pin assembly for carrying a radial and axial loads imposed on said upper frame comprising a downwardly opening socket mounted on said lower frame, and a pin disposed on the axis of rotation of said upper frame, said pin having an upper portion thereof rigidly secured to said upper frame and a lower portion thereof engageable in bearing contact with said socket whereby radial and axial loads imposed on said upper frame will be transmitted through said pin to said socket.

3. A center pin assembly according to claim 2 wherein the bearing contact surfaces of said pin and said socket are conical.

4. A center pin assembly according to claim 2 wherein the bearing contact surfaces of said pin and socket are spherical.

5. A center pin assembly according to claim 4 wherein the radius of the bearing contact surface of said pin is less than the radius of the bearing contact surface of said socket.

6. A center pin assembly according to claim 2 wherein the upper end of said pin is provided with an annular groove disposed in opposed relation to an annular wall of said upper frame, and including a pin retainer assembly comprising a plurality of arcuate locking segments received within said annular groove in said pin, a retainer ring received between said locking segments and said upper frame wall in wedging relation therewith, and means for urging said retainer ring into wedging relationship with said frame wall and said locking segments to maintain said locking segments in said annular pin groove.

7. A center pin assembly according to claim 6 wherein said locking segments and said pin are provided with inter-engaging surfaces disposed at an acute angle relative to the center line of said pin.

8. A center pin assembly according to claim 6 wherein said retainer ring and said locking ring segments are provided with inter-engaging surfaces disposed at an acute angle relative to the center line of said pin.

9. A center pin assembly according to claim 6 including a seating ring positioned on an annular shoulder on said upper frame adjacent said annular frame wall, for seating said locking ring segments.

10. A center pin assembly according to claim 9 wherein said seating ring and said locking ring segments are provided with inter-engaging surfaces disposed at an acute angle relative to the center line of said pin.

11. A center pin assembly according to claim 6 wherein said means for urging said retainer ring into wedging relationship with said locking ring segments comprises a cover plate engageable with said retainer ring and a plurality of bolts engaging said cover plate and threaded into openings in said upper frame.

12. A center pin assembly according to claim 11 including a plurality of torque resisting pins disposed between said cover plate and said pin.

13. In a power shovel having a lower frame and an upper frame rotatably mounted on said lower frame, a center pin assembly for carrying radial and axial loads imposed on said upper frame comprising a downwardly opening socket mounted on said lower frame, a pin disposed on the axis of rotation of said upper frame, said pin having a center section and an annular section, said center pin section having an upper end rigidly secured to said upper frame and a lower portion extending downwardly into said socket, said annular pin section being interposed between said socket and the lower end of said center pin section, said annular pin section and said socket having bearing contact surfaces, and means for displacing said annular pin section relative to the lower portion of said center pin section correspondingly providing a predetermined clearance between the bearing contact surfaces of said annular pin section and said socket.

14. A center pin assembly according to claim 13 including axially spaced, annular sealing rings disposed between the lower portion of said center pin section and said annular pin section providing an annular variable volume chamber therebetween and wherein said displacing means includes means for supplying a measured volume of fluid to said variable volume chamber to effect a predetermined displacement between said center and annular pin sections and correspondingly a predetermined clearance between the bearing contact surfaces of said socket.

15. A center pin assembly according to claim 14 wherein said fluid supply means includes means for supplying a volume of fluid to said variable volume chamber sufficient to displace said annular pin section relative to said center pin section to cause said annular pin section to engage said socket, and means for removing a predetermined volume of fluid from said variable volume chamber whereby the displacement of said annular pin section relative to said center pin section will decrease and correspondingly said annular pin section will be displaced relative to said socket providing a predetermined clearance therebetween.

16. A center pin assembly according to claim 13 wherein the bearing contact surfaces of said annular pin section and said socket are conical.

17. A center pin assembly according to claim 13 wherein the bearing contact surfaces of said annular pin section and said socket are spherical.

18. A center pin assembly according to claim 17 wherein the radius of the bearing contact surface of said annular pin section is less than the radius of the bearing contact surface of said socket.

19. A center pin assembly according to claim 13 wherein the upper end of said pin is provided with an annular groove disposed in opposed relation to an annular wall of said upper frame, and including a pin retainer assembly comprising a plurality of arcuate locking segments received within said annular groove in said pin, a retainer ring received between said locking segments and said annular frame wall in wedging relation therewith, and means for urging said retainer ring into wedging relationship with said frame wall and said locking segments to maintain said locking segments in said annular pin groove.

20. A center pin assembly according to claim 19 wherein said locking segments and said annular pin groove are provided with inter-engaging surfaces disposed at an acute angle relative to the center line of said pin.

21. A center pin assembly according to claim 19 wherein said retainer ring and said locking ring segments are provided with inter-engaging surfaces disposed at an acute angle relative to the center line of said pin.

22. A center pin assembly according to claim 19 including a seating ring positioned on an annular shoulder on said upper frame adjacent said annular frame wall for seating said locking ring segments.

23. A center pin assembly according to claim 22 wherein said seating ring and said locking ring segments are provided with inter-engaging surfaces disposed at an acute angle relative to the center line of said pin.

24. A center pin assembly according to claim 19 wherein said means for urging said retainer ring into wedging relationship with said locking ring segments comprises a cover plate engageable with said retainer ring and a plurality of bolts engaging said cover plate and threaded into openings in said upper frame.

25. A center pin assembly according to claim 24 including a plurality of torque resisting pins disposed between said cover plate and said center pin section.

26. A center pin assembly according to claim 24 wherein said rotation preventing means comprises a plurality of torque resisting pins disposed between said annular and center pin sections.

27. A center pin assembly according to claim 13 including means for preventing rotation of said annular pin section relative to said center pin section.

28. A center pin assembly according to claim 13 wherein said center pin section includes a laterally projecting annular portion, and wherein an inner portion of said annular pin section is supported on said laterally projecting annular portion.

29. In a power shovel having a lower frame and an upper frame rotatably mounted on said lower frame, a center pin assembly for carrying radial and axial loads imposed on said upper frame comprising a socket mounted on one of said frames, and a pin disposed on the axis of rotation of said upper frame, said pin having a center section and an annular section, said center pin section having an end rigidly secured to the other of said frames and an opposite end portion extending into said socket, said annular pin section being interposed between said socket and said other end of said center pin section, said annular pin section and said socket having opposed bearing contact surfaces, and means for displacing said annular pin section relative to the opposite end portion of said center pin section to correspondingly provide a predetermined clearance between said annular pin section and said socket.

30. A center pin assembly according to claim 29 including axially spaced, annular sealing rings disposed between said opposite end of said center pin section and said annular pin section, providing an annular variable volume chamber, and wherein said displacing means includes means for supplying a measured volume of fluid to said variable volume chamber to effect said displacement and correspondingly provide said clearance.

31. In a power shovel having a lower frame and an upper frame rotatably mounted on said lower frame and a center pin disposed on the axis of rotation of said upper frame, rigidly secured to one of said frames and operatively connected to another of said frames for transmitting radial and axial loads imposed on one of said frames to the other thereof, an assembly for rigidly securing said pin to said one of said frames comprising a plurality of arcuate locking segments receivable within an annular groove disposed in said pin, a retainer ring disposable between said locking segments and an annular wall of said one of said frames, in wedging relation therewith, and means for urging said retainer ring into wedging relationship with said frame wall and said locking segments to maintain said locking segments in said annular pin groove.

32. An assembly according to claim 31 wherein said locking segments and said annular pin groove are provided with inter-engaging surfaces disposed at an acute angle relative to the center line of said pin.

33. An assembly according to claim 31 wherein said retainer ring and said locking ring segments are provided with inter-engaging surfaces disposed at an acute angle relative to the center line of said pin.

34. An assembly according to claim 31 including a seating ring positioned on an annular shoulder of said one of said frame disposed adjacent said annular frame wall for seating said locking ring segments.

35. An assembly according to claim 33 wherein said seating ring and said locking ring segments are provided with inter-engaging surfaces disposed at an acute angle relative to the center line of said pin.

36. An assembly according to claim 31 wherein said means for urging said retainer ring wedging relationship with said locking ring segments comprises a cover plate engageable with said retainer ring and a plurality of bolts engaging said cover plate and threaded into openings in said one of said frame.

37. An assembly according to claim 36 including a plurality of torque resisting pins disposed between said cover plate and said pin.

* * * * *